(12) United States Patent
Nishihara et al.

(10) Patent No.: US 6,265,126 B1
(45) Date of Patent: Jul. 24, 2001

(54) HYDROPHOBIC METAL OXIDE POWDER AND APPLICATION THEREOF

(75) Inventors: Akira Nishihara; Yukiya Yamashita; Hideaki Sakurai, all of Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/447,830

(22) Filed: Nov. 23, 1999

Related U.S. Application Data

(63) Continuation of application No. 08/849,082, filed as application No. PCT/JP96/02836 on Sep. 30, 1996, now abandoned.

(30) Foreign Application Priority Data

| Oct. 2, 1995 | (JP) | 7-255145 |
| Oct. 2, 1995 | (JP) | 7-255146 |
| Apr. 18, 1996 | (JP) | 8-97010 |
| Apr. 18, 1996 | (JP) | 8-97011 |

(51) Int. Cl.$^7$ ............................................. G03G 9/097
(52) U.S. Cl. ........................... 430/110; 428/405; 428/407
(58) Field of Search .................................. 430/110, 111; 428/405, 407

(56) References Cited

FOREIGN PATENT DOCUMENTS 63-155155  *  6/1988  (JP).

OTHER PUBLICATIONS

English translation of JP 63–155155, Jun. 1988.*

* cited by examiner

*Primary Examiner*—Christopher Rodee
(74) *Attorney, Agent, or Firm*—Oblon, Spivak, McClelland, Maier & Neustadt, P.C.

(57) ABSTRACT

A hydrophobic metal oxide powder obtained by simultaneously surface-treating a powder of a metal oxide (for example, silica, titania, alumina, or the like) with silicone oil having epoxy groups and a non-polymeric amine compound having a lower number of primary and/or secondary amino groups than the number required for reaction with all epoxy groups, or surface-treating the powder with silicon oil having epoxy groups and amino groups and previously obtained by reaction. Straight silicone oil may be further used for surface treatment. Frictional charge which is controlled within a wide range of from negative charge to positive charge, high hydrophobicity and fluidity can be imparted to the powder by using a relatively small amount of coating, and a hydrophobic metal oxide powder useful as an additive for an electrophotographic developer can be obtained.

22 Claims, No Drawings

HYDROPHOBIC METAL OXIDE POWDER AND APPLICATION THEREOF

This application is a continuation of application Ser. No. 08/849,082, filed Jun. 2, 1997, now abandoned and of PCT/JP96/02836, filed Sep. 30, 1996.

TECHNICAL FIELD

The present invention relates to a hydrophobic metal oxide powder suitably added to an electrophotographic developer in order to improve fluidity of a toner, control the charge thereof, etc., and an electrophotographic developer containing the same.

BACKGROUND ART

In electrophotography, the development process is carried out by adhering a toner to an electrostatic latent image on a photosensitive member. A general electrophotographic developer contains a toner and a carrier for imparting charge to the toner by frictional charging and carrying the toner to a development region. In general, the toner comprises a thermoplastic resin, a colorant, and a charge controller, and the carrier comprises a magnetic powder of iron, ferrite (iron oxide) or the like. It is known that besides the toner and carrier, various additives can be added to the developer for the purpose of controlling the charge of the toner, improving the fluidity and cleaning properties of the toner, etc.

For example, a hydrophobic metal oxide powder obtained by making hydrophobic the surfaces of a metal oxide powder of silica, alumina, titania or the like using an organic material is added as an agent for improving the fluidity and cleaning properties of the toner to an electrophotographic developer. Such a hydrophobic metal oxide powder is also known to be used as a charge controller. Therefore, hydrophobicity and frictional charge are important features for this type of hydrophobic metal oxide powder, and these features are controlled by the type and the coating amount of the organic materials used for surface treatment of a metal oxide powder.

In general surface treatment of a metal oxide powder, surface treatment of the powder with an amine organic compound is known to decrease the negative charge of the powder or impart positive charge to the powder. It is also proposed that the metal oxide powder surface-treated with such an amine organic compound is used as a charge controller for toner.

For example, Japanese Examined Patent Publication No. 53-22447 proposes that a metal oxide powder surface-treated with aminosilane (an amino-containing silane coupling agent) is used as a positive charge controller for toner. In addition, Japanese Unexamined Patent Publication No. 62-52561 discloses an electrophotographic toner containing as a positive charge controller a powder obtained by treating vapor phase silica with epoxy-containing silane and then with an amine. In general, a metal oxide powder surface-treated with such silane cannot be sufficiently increased in hydrophobicity, and does not have the sufficient effect of improving the fluidity and cleaning properties of the toner.

Japanese Unexamined Patent Publication Nos. 6-80406 and 6-83099 disclose that organopolysiloxane containing epoxy groups and a metal oxide powder surface-treated with polyalkyleneimine are added to an electrophotographic developer for the purpose of both improving fluidity and controlling charge. However, it was found that since the polyalkyleneimine (for example, polyethyleneimine) used as an amine is a polymeric amine containing many amino groups per molecular weight and having a high molecular weight, and the surface of the powder is covered with polyalkyleneimine chains with relatively high hydrophilicity, hydrophobicity and fluidity become insufficient.

Japanese Unexamined Patent Publication No. 63-155155 discloses an electrostatic image developer containing inorganic fine particles which are treated with silicone oil containing epoxy groups and then with an amino compound. However, the inorganic particles treated in two steps as described above have unreliable charge controllability and/or insufficient hydrophobicity.

An object of the present invention is to provide a hydrophobic metal oxide powder which can be controlled in frictional charge within a wide range by using a relatively small amount of coating, and which is provided with high hydrophobicity and fluidity, and also an electrophotographic developer containing the hydrophobic metal oxide powder.

DISCLOSURE OF THE INVENTION

The above object can be achieved by simultaneously surface-treating a metal oxide powder with silicone oil containing epoxy groups and an amine compound having active hydrogen, or surface-treating a metal oxide powder with silicone oil containing epoxy groups and amino groups and previously obtained by reaction. When hydrophobicity is desired to be further improved, straight silicone oil may be further used with above components.

In according to the present invention, there are provided the following:

(1) A hydrophobic metal oxide powder having surface coating and formed by simultaneous surface treatment with silicone oil containing epoxy groups and a non-polymeric amine compound having a lower number of primary and/or secondary amino groups than the total number of the epoxy groups; and (2) A hydrophobic metal oxide powder having surface coating and formed by surface treatment with silicone oil containing epoxy groups and amino groups.

In the surface treatments for the hydrophobic metal oxide powders (1) and (2), straight silicone oil may be further used with the above components.

For the hydrophobic metal oxide powder (2), silicone oil having epoxy groups and amino groups can be prepared by reacting silicone oil having epoxy groups with a non-polymeric amine compound having a lower number of primary and/or secondary amino groups than the necessary number for reaction with all epoxy groups.

The hydrophobic metal oxide powder of the present invention preferably exhibits a degree of hydrophobicity of 60% or more which is measured by a transmittance method.

In accordance with the present invention, there is provided an electrophotographic developer containing the hydrophobic metal oxide powder.

BEST MODE FOR CARRYING OUT THE INVENTION

In the present invention, the type of the metal oxide powder subjected to surface coating is not limited, and any metal oxide powder can be selected according to application. Preferable metal oxide for improving fluidity of toner include silica, alumina and titania (titanium oxide), but other metal oxides such as zirconia (zirconium oxide), zinc oxide, tin oxide, and the like can also be used according to application.

The particle size of the metal oxide powder may also be selected according to application. A powder having a specific surface area of 50 $m^2/g$ or more is preferably used for improving fluidity of toner.

The metal oxide may be a composite oxide comprising at least two metals, or a mixture of at least two metal oxides.

The metal oxide powder is preferably synthesized by a vapor phase method. The metal oxide powder synthesized by the vapor phase method has less aggregation of particles, and is thus suitable for improving the fluidity of toner. The metal oxide powder is synthesized by the vapor phase method, for example, the known method of decomposing a metal chloride such as silicon tetrachloride or the like, and industrial synthetic products are commercially available.

In accordance with the present invention, coating is formed on the surfaces of the metal oxide powder by surface treatment with (1) silicone oil having epoxy groups (referred to as "epoxy-modified silicone oil" hereinafter) and an amine compound (=an amine compound having active hydrogen) having a lower number of primary and/or secondary amino groups than the total number of the epoxy groups, (2) silicone oil (referred to as "epoxy/amino-modified silicone oil" hereinafter) having epoxy groups and amino groups, or (3) straight silicone oil in addition to (1) and (2).

Epoxy groups have the function to strongly combine silicone oil with the metal oxide powder, and modified silicone oil imparts hydrophobicity to the metal oxide powder. When the effect of imparting hydrophobicity is insufficient, the effect of imparting hydrophobicity can be increased by using straight silicone oil with modified silicone oil. Amino groups change the charge of the metal oxide powder to positive, and the charge applied to the powder greatly depends upon the type of amino groups.

Epoxy/amino-modified silicone oil is preferably prepared by reacting silicone oil having epoxy groups (referred to as "epoxy-modified silicone oil" hereinafter) with an amine compound having primary and/or secondary amino groups in an amount smaller than the necessary stoichiometric amount for reacting with all epoxy groups. Conversely, silicone oil having epoxy groups and amino groups can also be prepared by reacting silicone oil having primary and/or secondary amino groups (referred to as "amino-modified silicone oil" hereinafter) with an epoxy compound having at least two functional groups in an amount smaller than the amount necessary for reacting with the total of primary and secondary amino groups. However, since the types of epoxy compounds having at least two functional groups, which are easy to obtain, are very limited, there are very few types of silicone oil which can be prepared, as compared with the first reaction, and thus the second reaction is disadvantageous in the point that frictional charge is controlled within a wide rage, which relates to the object of the present invention.

Therefore, in accordance with the present invention, surface treatment of the metal oxide powder is carried out by using epoxy-modified silicone oil and an amine compound having a lower number of primary and/or secondary amino groups than the total of the epoxy groups after these materials are previously reacted or by simultaneously using these components which are not reacted, and further using straight silicone oil as occasion demands. If the total number of primary and secondary amino groups contained in the amine compound is higher than the total number of epoxy groups contained in silicone oil, the hydrophobicity and fluidity of the surface-treated metal oxide powder significantly deteriorate. When both components are previously reacted, since the epoxy groups are substantially completely reacted to disappear, thereby causing the need for surface treatment at a high temperature and decreasing the bonding force between the formed coating and the powder surface.

The epoxy-modified silicone oil and the amine compound are preferably used at a molar ratio of the total of the primary and secondary amino groups in the amine compound to the total of the epoxy groups in the silicone oil within the range of 0.1 to 0.9, particularly, 0.2 to 0.8. At a molar ratio of less than 0.1, the number of the amino groups introduced is small, and thus charge is not sufficiently controlled. While at a molar ratio of over 0.9, the time stability of the hydrophobic metal oxide powder obtained after surface treatment deteriorates. When the amine compound is previously reacted, at a molar ratio of over 0.9, bonding between the coating and the powder is insufficient due to a decrease in number of unreacted epoxy groups, and unreacted amine compound tends to remain. This is undesirable because of its adverse effect on charge stability or improvement in hydrophobicity.

When both components are previously reacted before use, in reaction, the epoxy groups in the silicone oil partly react with the primary or secondary amino groups in the amine compound to open the rings, and thus —OH groups and —NR groups (amino groups) are introduced into the silicone oil in place of the epoxy groups. As a result, epoxy/amino-modified silicone oil having unreacted epoxy groups and the amino groups introduced by reaction is obtained.

Although this reaction proceeds simply by mixing both components at room temperature or agitating the components in a polar solvent such as an alcohol or the like, if required, the reaction may be affected under heating at a temperature at which the reaction components do not volatilize. If the amine compound contains primary amino groups, although —NH groups are produced by reaction, and possibly further reacted with the epoxy groups, the possibility of reacting with the epoxy groups is thought to be low, and thus the stoichiometric amount can be estimated at the above ratio of amino groups to epoxy groups.

The epoxy-modified silicone oil represents oily organopolysiloxane having epoxy groups. For example, epoxy-modified silicone oil having a structure having glycidyl groups and/or cyclic epoxy groups in the terminals and/or side chains of a dimethylpolysiloxane skeleton is commercially available.

Preferable epoxy-modified silicone oil has glycidyl groups as epoxy groups and an epoxy equivalent of 200 to 3000 g/mol. If the epoxy equivalent exceeds 3000 g/mol, although the cause is not known, the reaction with the amine compound hardly produces sufficient effects. The viscosity of the silicone oil is preferably within the range of 5 to 100 cSt at 250C. With a viscosity of over 100 cSt, fluidity deteriorates, while with a viscosity of less than 5 cSt, the silicone oil easily volatilizes in surface treatment of the metal oxide powder.

Particularly preferable epoxy-modified silicone oil has glycidyl groups in both terminals of its molecule, an epoxy equivalent of 300 to 1000 g/mol and a viscosity of 10 to 50 cSt at 250C. The epoxy-modified silicone oil more preferably has glycidyl groups only in both terminals of its molecule. Because the present of glycidyl groups in both terminals and side chains possibly deteriorates hydrophobicity.

Examples of commercial products of epoxy-modified silicone oil include KF-101, KF-102, KF-103, KF-105, X-22-163A, X-22-169AS, X-22-163B, X-22-163C, X-22-169B, etc., which are produced by Shin-Etsu Silicone Co., Ltd.; SF8411, SF8413, SF8421, etc., which are produced by Dow Corning Toray Silicone Co., Ltd.; and TSF4730, TSF4731, TSL9946, TSL9986, TSL9906, etc., which are produced by Toshiba Silicone Co., Ltd.

As the amine compound previously reacted with the epoxy-modified silicone oil or not previously reacted and used together with the epoxy-modified silicone oil for surface treatment, non-polymeric amine compounds having primary and/or secondary amino groups reactive with epoxy groups are used. The use of polymeric amine compounds such as polyalkyleneimine causes the coated surface to be substantially covered with polymeric amine (with relatively high hydrophilicity), as described above, and thus the metal oxide powder after surface treatment has very low hydrophobicity, thereby causing the insufficient effect of improving fluidity.

As illustrated in examples below, the charge of the hydrophobic metal oxide powder of the present invention greatly depends upon the type of the amine compound used. Namely, if the amine compound adheres to the surface of the metal oxide powder, the amine compound generally changes the charge to positive, and the degree of change (the effect of imparting positive charge) greatly depends upon the type of the amine compound used. It is thus possible to control the charge (frictional charge measured by the method below) of the hydrophobic metal oxide powder, e.g., a silica powder, within a wide range of from a negative charge of about −500 $\mu$C/g to a positive charge of over 300 $\mu$C/g by changing the type and amount of the amine compound used. Therefore, the type of the amine compound may be selected according to the desired level of charge required for toner.

The effects of amine compounds on charge are as follows:
(A) Amine having the relatively small effect of imparting positive charge
  (1) Aliphatic primary amine ($R^1NH_2$: $R^1$ is an alkyl group having 4 to 20 carbon atoms, and an alkyl group may have an ether bond);
  (2) Aromatic amine (aromatic amine having at least one primary or secondary amino group, for example, aniline, toluidine, or the like);
  (3) Heterocyclic amine (heterocyclic amine having at least one primary or secondary amino group, for example, pyrrole, imidazole, indole, or the like).

(B) Amine having the large effect of imparting positive charge
  (1) Aliphatic secondary amine ($R^1R^2NH$: $R^1$ and $R^2$ are the same or different alkyl groups each having 1 to 10 carbon atoms, and an alkyl group may have an ether bond);
  (2) Diamine ($R^1R^2NXNHR^3$: $R^1$, $R^2$ and $R^3$ are each a hydrogen atom or an alkyl group having 1 to 10 carbon atoms, and may be the same or different, an alkyl group may have an ether bond, and X is an alkylene group having 1 to 10 carbon atoms);
  (3) Triamine $R^1R^2NXNRR^3YNHR^4$ $R^1$, $R^2$, $R^3$ and $R^4$ are each a hydrogen atom or an alkyl group having 1 to 10 carbon atoms (however, all groups are not hydrogen atoms), and may be the same or different, an alkyl group may have an ether bond, and X and Y are each an alkylene group having 1 to 10 carbon atoms), and higher amines such as similar tetramine and the like;
  (4) Alicyclic amine (alicyclic amine having at least one primary or secondary amino group, for example, piperazine, piperidine, or the like);
  (5) Heterocyclic amine having primary or secondary aminoalkyl group (for example, triazine) or alicyclic amine (for example, piperazine). In this case, heterocyclic amine or alicyclic amine may have only a tertiary amino group.

The above description has been made in connection with a measure for selecting the amine compound, and the amine compound actually used may be selected on the basis of experimental examination of the effect of imparting charge. In addition, at least two amine compounds may be used. In this case, as a result of mixing, the charge imparting behavior of the amine compound is sometimes different from the above.

When positive charge is desired to be imparted, particularly preferable amine compounds are the above diamines, i.e., compounds represented by the formula $R^1R^2NXNHR^3$. Since these compounds can impart high positive charge by adding a relative small amount of compound, as compared with the other amine compounds. it is possible to efficiently stably obtain the metal oxide powder having a frictional charge within the range of +10 to +250 $\mu$C/g and being useful as a fluidity improver for a toner with positive charge. Of these amine compounds, diamines wherein $R^1$ and $R^2$ are each an alkyl group having 1 to 6 carbon atoms, $R^3$ is a hydrogen atom or an alkyl group having 1 to 6 carbon atoms, and X is —$(CH_2)_n$— (n is an integer of 2 to 4) are preferable for imparting positive charge. As the number of carbon atoms of the alkyl group joined to a nitrogen atom increases, hydrophobicity of a metal oxide powder increases, resulting in the tendency that stable charge can be obtained.

On the other hand, a metal oxide powder having stable negative charge (for example, −100 to −200 $\mu$C/g) is also useful for a toner with negative charge. In this case, such a metal oxide powder having negative charge is obtained by controlling the amount of the amine compound added, which has the large effect of imparting positive charge, or using an amine compound having a relative small effect of imparting positive charge. The use of an amine compound having the large effect of imparting positive charge can obtain the intended negative charge by adding only a small amount of compound, while the use of an amine compound having a relative small effect of imparting positive charge can easily obtain stable negative charge because charge is hardly changed by the amount of the amine compound added.

When the effect of imparting hydrophobicity cannot be sufficiently attained by using only the modified silicone oil only, straight silicone oil can be further used for surface treatment. Straight silicone oil means unmodified silicone oil in which methyl groups, hydroxyl groups, phenyl groups and/or hydrogen are joined to silicon. Examples of such straight silicone oil include dimethyl silicone oil, methylphenyl silicone oil, and methylhydrogen silicone oil. Of these silicone oils, dimethyl silicone oil being lowest in price and having a wide range of viscosity is preferred. Straight silicone oil having a viscosity of 10 to 100 cst at 25° C. is preferably used.

Examples of commercial products of such straight silicone oil include KF-96, KF-99, KF-50, KF-54, KF-56, and the like, which are produced by Shin-Etsu Silicone Co., Ltd.; SH200, PRX413, SH510, SH702, SH705, SH550, SH704, and the like, which are produced by Dow Corning Toray Silicone Co., Ltd.; TSF451, YF3800, TSF484, TSF483, TSF431, TSF437, TSF4300, TF3804, TSL9546, TSL95586, and the like, which are produced by Toshiba Silicone Co., Ltd.; and L-45, L-31, FZ-3805, FZ-3702, FZ-3122, and the like, which are produced by Nippon Unicar Co., Ltd.

The metal oxide powder of the present invention may be surface-treated by a conventional known method, i.e., either a wet method or a dry method. However, when the metal oxide powder is synthesized by the vapor phase method, the dry method is preferable because aggregation hardly occurs. The dry method is also advantageous in the use of a small amount of the treating solution, the ease of control of the coating amount of the powder, and simplicity of the operation.

Surface treatment can be carried out by the dry method, for example, comprising adding dropwise or spraying the epoxy-modified silicone oil and the amine compound to the metal oxide powder under sufficient agitation in an appropriate closed container after the components have previously been reacted or without being reacted. When the epoxy-modified silicone oil and the amine compound are added without being reacted, the components can be added simultaneously or one after the other. If required, the components used for surface treatment may be diluted with or dissolved in a solvent (e.g., alcohol, acetone, hydrocarbon, or the like) before use.

The epoxy-modified silicone oil and the amine compound, or the epoxy/amino-modified silicone oil obtained by reaction of these components, and if required, straight silicone oil, are added to the metal oxide powder, followed by heating at a temperature within the range of 80 to 250° C., and preferably within the range of 100 to 170° C., under a nitrogen stream, to strongly combine the silicon oil with the surface of the metal oxide powder, and, at the same time, remove the solvent if required. Since the silicone oil has epoxy groups having high reactivity to the surface of the metal oxide powder, surface coating can be achieved by heat treatment at such a relatively low temperature.

When the above dry treatment is difficult for the type the metal oxide powder used, the metal oxide powder can be surface-treated by the wet method comprising soaking the powder in a solution obtained by dissolving the silicone oil (and the amine compound) in an appropriate solvent, recovering the powder from the solution and then heating it as described above.

In this surface treatment, the charge of the metal oxide powder is changed by the amine compound joined to the powder surface through the epoxy-modified silicone oil or the amino groups in the epoxy/amino-modified silicone oil joined to the powder surface mainly through epoxy groups, and at the same time, the powder surface is rendered hydrophobic by the silicone oil. In addition, since the silicon oil (and the amine compound) is strongly joined to the powder surface, the surface-treated metal oxide powder is hardly affected by environmental conditions, e.g., humidity, and exhibits less changes with time in characteristics such as hydrophobicity and charge, and excellent stability.

The amounts of the silicone oil and amine compound coated on the surface of the metal oxide powder are selected so as to obtain the above-mentioned desired charge, and at the same time, impart sufficient hydrophobicity (and fluidity). In order to ensue sufficient hydrophobicity, the silicone oil (when straight silicone oil is used together with the silicone oil, the total amount of the modified silicone oil and the straight silicone oil) is preferably used in an amount within the range of 5 to 40 parts by weight, particularly 10 to 30 parts by weight, relative to 100 parts by weight of metal oxide powder. In regard to the amount of the amine compound used or the amount of the amino groups contained in the epoxy/amino-modified silicone oil, from the viewpoint of the effect of imparting charge, the modified silicone oil is preferably used so that the molar ratio of the total number of primary, secondary and tertiary amino groups to the OH groups present in the surface of the metal oxide powder is within the range of 0.1 to 1.0, particularly 0.2 to 0.6.

As the hydrophobicity of the hydrophobic metal oxide powder obtained by surface treatment increases, a change in charge of toner with humidity decreases due to a decrease in hygroscopicity of the metal oxide powder, and the effect of preventing aggregation (the effect of improving fluidity) increases, thereby increasing the availability of the metal oxide powder. In practical use, the degree of hydrophobicity measured by the transmittance method is 60% or more, preferably 70% or more, and more preferably 80% or more.

The transmittance method is a method for determining the degree of hydrophobicity of a powder by experiment. In this method, 1.0 g of powder and 100 ml of water are poured into a factional funnel for extraction, and then vigorously shaken and agitated for 10 minutes. Then, the mixture is allowed to stand for 10 minutes, and a small amount of suspension is extracted through the bottom of the fractional funnel. The transmittance of the thus-extracted suspension is measured with light of 550 nm, and the measured value relative to the transmittance of 100% of pure water is shown as the degree of hydrophobicity of the powder.

The charge of the resultant hydrophobic metal oxide powder can be evaluated by a blow-off method for measuring the frictional charge amount. A method for measuring frictional charge relative to iron by the blow off method is prescribed in, for example, "Shikizai" 55[9]. 630–636 (1982), etc. In the present invention, the frictional charge was determined by the method prescribed in "Shikizai".

The hydrophobic metal oxide powder of the present invention can be contained as an additive for improving fluidity and cleaning properties of toner or a charge controlling agent in an electrophotographic developer used for a copying machine and a printer. As a result, an electrophotographic developer having stable charge and excellent fluidity can be obtained. The hydrophobic metal oxide powder can also be contained in the silicone rubber roll used in a copying machine or the like to be used for controlling charge.

When the hydrophobic metal oxide powder is contained in an electrophotographic developer, it is preferable for practical use that the amount of the hydrophobic metal oxide powder added is within the range of 0.1 to 20% by weight based on the total amount of the toner used. The amount of the hydrophobic metal oxide powder used as a charge controller is generally larger than the amount of the hydrophobic metal oxide powder used as a fluidity improver. 0.1 to 3% by weight of powder is sufficient for use as a fluidity improver.

Other components of toner, and the carrier contained in toner may be the same as conventional known electrophotographic developers.

In the present invention, the fluidity of the toner containing the hydrophobic metal oxide powder is evaluated by a sieve shaking method which will be described below. In this method, a styrene-acrylic copolymer resin containing 18% by weight of carbon dispersed therein is ground, and then classified to obtain a resin having an average particle size of 7±3 μm, and 0.05 g of surface-treated metal oxide powder is added to 10 g of the thus-obtained resin, followed by mechanical mixing for 30 seconds to prepare a toner. 5 g of thus-prepared toner is put in a sieve of 100 mesh (mesh size: 150 μm), and shaken by an electromagnetic sieve shaker for 1 minute, and the ratio by weight (%) of the toner passing through the sieve is determined, and shown as the fluidity of the toner. As the fluidity of the toner increases, the occurrence of fogging and a decrease in image density decrease in development of an electrophotograph using this toner.

The hydrophobic metal oxide powder of the present invention can improve the fluidity of not only a toner but also a resin powder, and can be used as a fluidizer for powder plastics, an additive for powder paint, etc.

Although the present invention will be described in detail below with reference to examples, the examples are nothing abut examples, and the present invention is not limited to these examples.

EXAMPLE 1

This example is an example in which a metal oxide powder is simultaneously surface-treated with epoxy-modified silicone oil and an amine compound.

20 g of each of the metal oxide powders shown in Table 3 was dried by heating, and placed in a stainless steel container with an agitator, and the epoxy-modified silicone oil and amine compound shown in Table 3 were then simultaneously sprayed on the powder in a floating state at room temperature in a nitrogen stream under agitation. The silicone oil and the amine compound were dissolved in methanol or hexane, and then used. In Table 3, the amount of the epoxy-modified silicone oil used was shown by the total number of epoxy groups, and the amount of the amine compound used was shown by the total number of amino groups (primary, secondary and tertiary) or the total number of primary and secondary amino groups (the number of primary and secondary N) (in both cases, the unit is mmol).

The meanings of the symbols of the epoxy-modified silicone oil and amine compounds are as shown in Tables 1 and 2.

TABLE 1

Epoxy-modified silicone oil

| Symbol | Trade Name | Structure | Epoxy Equivalent |
|---|---|---|---|
| A | KF105[1] | Silicone with glycidyl-modified both terminals | 490 g/mol |
| B | X-22-163A[1] | Silicone with glycidyl-modified both terminals | 950 g/mol |
| C | X22-169AS[1] | Silicone with alicyclic epoxy-modified both terminals | 530 g/mol |
| D | FZ-3745[2] | Silicone with glycidyl-modified side chains and both terminals | 400 g/mol |
| E | BY16-855[3] | Silicone with alicyclic epoxy-modified side chains and both terminals | 650 g/mol |

Straight silicone oil

| Symbol | Trade Name | Type | Group joined to Si atoms |
|---|---|---|---|
| F | KF96[1] | Dimethyl silicone oil | methyl |
| G | PRX413[3] | Dimethyl silicone oil | methyl, hydroxyl |
| H | KF56[1] | Dimethylphenyl silicone oil | methyl, phenyl |
| I | KF99[1] | Methylhydrogen silicone oil | methyl, H |

[1]: Produced by Shin-Etsu Silicone Co., Ltd.
[2]: Produced by Nippon Unicar Co., Ltd.
[3]: Produced by Dow Corning Toray Co., Ltd.

TABLE 2

Amine Compound

| Symbol | Structure | Number of N atoms | Numer of reactive N atoms |
|---|---|---|---|
| a | $(n\text{-}Bu)_2N(CH_2)_3NH_2$ | 2 | 1 |
| b | $(n\text{-}Bu)_2NH$ | 1 | 1 |
| c | $HN\langle\text{cyclohexane}\rangle N(CH_2)_2NH_2$ | 3 | 2 |
| d | $(n\text{-}Bu)_2N(CH_2)_2NH(CH_2)_2NH_2$ | 3 | 2 |
| e | triazine-$CH_2NH_2$ | 4 | 2 |
| f | $C_2H_{25}NH_2$ | 1 | 1 |
| g | $PhNH_2$ (aniline) | 1 | 1 |
| h | $(n\text{-}Bu)_2N(CH_2)_3NHCH_3$ | 2 | 1 |
| i | polyethyleneimine (average molecular weight: about 70,000) (all nitrogen atoms are reactive atoms) | | |

Number of reactive N atoms = total number of primary amine groups + secondary amine groups
n-Bu = n-butyl; Ph = phenyl Of the above amine compounds, polyethyleneimine i is a polymeric compound and is unsuitable for use in the present invention.

After spraying was completed, the metal oxide powder was further agitated at room temperature for 30 minutes, externally heated under a nitrogen stream, heated to 150° C. over 30 minutes, heated at this temperature for 1 hour, and then cooled to room temperature under agitation.

Table 3 shows the results of the above-mentioned measurement of the degree of hydrophobicity and the frictional charge of the resultant hydrophobic metal oxide powders relative to ion powder, and the fluidity of the toners containing these powders.

30 g of each toner containing metal oxide and used in the fluidity test and 1000 g of iron oxide powder were mixed to prepare an electrophotographic developer which was placed in an electrophotographic copying machine for a life test. Table 3 also shows the results of the life test. The developers containing the metal oxide powders of the examples exhibited good images even under an environment of high temperatre and high humidity (28° C., 85%RT).

EXAMPLE 2

This example is an example in which a metal oxide powder is surface-treated with the epoxy/amino-modified silicone oil obtained by previously reacting epoxy-modified silicone oil and an amine compound.

A metal oxide powder was surface-treated by the same method as Example 1 except that epoxy-modified silicone oil and an amine compound were previously reacted by mixing at 50° C. for twenty-four hours, and then used for spraying. Table 4 shows together the results of the degree of hydrophobicity and the frictional charge of each of the resultant hydrophobic metal oxide powders relative to ion powder, the fluidity of the toner containing each powder and the life test of an electrophotographic developer. The meanings of the symbols shown in Table 4 are as shown in Tables 1 and 2.

TABLE 3

| Remarks | Test No. | Metal Oxide Powder (Specific Surface Area: m²/g) | Epoxy-Modified Silicone Oil (mmol)[1] | Amine (mmol)[2] | Frictional Charge (μC/g) | Degree of Hydrophobicity (%) | Fluidity (%) | Life Test[3] (Number of Copies) |
|---|---|---|---|---|---|---|---|---|
| Example | 1 | Silica (200) | A (5) | a (8/4) | 205 | 80 | 91 | >45,000 |
|  | 2 |  |  | a (5/2.5) | −273 | 85 | 92 | >40,000 |
|  | 3 |  |  | a (2/1) | −560 | 92 | 88 | >38,000 |
|  | 4 |  |  | b (4/4) | −10 | 84 | 85 | >41,000 |
|  | 5 |  |  | c (6/4) | 43 | 75 | 90 | >39,000 |
|  | 6 |  |  | d (6/4) | 220 | 82 | 90 | >40,000 |
|  | 7 |  |  | e (16/4) | 50 | 85 | 86 | >32,000 |
|  | 8 |  |  | f (2/2) | −513 | 93 | 90 | >38,000 |
|  | 9 |  |  | f (4/4) | −340 | 92 | 96 | >42,000 |
|  | 10 |  |  | g (4/4) | −215 | 88 | 80 | >35,000 |
|  | 11 |  | B (5) | a (8/4) | 182 | 84 | 88 | >40,000 |
|  | 12 |  | C (5) |  | 150 | 81 | 76 | >35,000 |
|  | 13 | Silica (130) | B (5) | h (8/4) | 233 | 90 | 78 | >30,000 |
|  | 14 |  | C (5) |  | 217 | 76 | 89 | >37,000 |
|  | 15 | Titania (50) | A (5) | a (8/4) | 280 | 83 | 96 | >43,000 |
|  | 16 | Alumina (100) |  |  | 360 | 85 | 87 | >40,000 |
| Comp. Example | 17 | Silica (200) | A (5) | f (10/10) | −180 | 47 | 73 | 10,000 |
|  | 18 |  |  | i (10/10) | 153 | 35 | 23 | 6,000 |
|  | 19 | Titania (50) |  |  | 226 | 35 | 21 | 5,000 |
|  | 20 | Alumina (100) |  |  | 296 | 23 | 16 | 9,000 |
| Control | 21 | Silica (200) | A (5) | — | −670 | 83 | 93 | >32,000 |
|  | 22 | Titania (50) |  | — | −213 | 86 | 80 | >28,000 |
|  | 23 | Alumina (100) |  | — | −14 | 84 | 85 | >27,000 |
|  | 24 | Silica (200) | B (5) | — | −595 | 78 | 79 | >25,000 |
|  | 25 |  | C (5) | — | −610 | 75 | 78 | >18,000 |
|  | 26 | Silica (200) | — | — | −380 | — | — | — |

(Note)
[1]; The number in parentheses is the total number of epoxy groups (mmol).
[2]; The number in parentheses is the total N number/primary and secondary N number (mmol).
[3]; The number of copies obtained until fogging occurs in images.

TABLE 4

| Remarks | Test No. | Metal Oxide Powder (Specific Surface Area: m²/g) | Material Used in Surface Treatment | | Frictional Charge (μC/g) | Degree of Hydrophobicity (%) | Fluidity (%) | Life Test[3] (Number of Copies) |
|---|---|---|---|---|---|---|---|---|
| | | | Epoxy-Modified Silicone Oil (mmol)[1] | Amine (mmol)[2] | | | | |
| Example | 1 | Silica (200) | A (5) | a (8/4) | 230 | 83 | 88 | >40,000 |
| | 2 | | | a (5/2.5) | −310 | 85 | 86 | >40,000 |
| | 3 | | | a (2/1) | −510 | 83 | 92 | >43,000 |
| | 4 | | | b (4/4) | 51 | 92 | 90 | >40,000 |
| | 5 | | | c (6/4) | 42 | 80 | 90 | >38,000 |
| | 6 | | | d (6/4) | 243 | 86 | 82 | >35,000 |
| | 7 | | | e (16/4) | 83 | 83 | 78 | >31,000 |
| | 8 | | | f (2/2) | −480 | 90 | 90 | >40,000 |
| | 9 | | | f (4/4) | −288 | 95 | 92 | >45,000 |
| | 10 | | | g (4/4) | −243 | 93 | 87 | >38,000 |
| | 11 | | B (5) | a (8/4) | 155 | 82 | 85 | >35,000 |
| | 12 | | C (5) | | 171 | 84 | 83 | >35,000 |
| | 13 | Silica (130) | B (5) | h (8/4) | 260 | 88 | 83 | >33,000 |
| | 14 | | C (5) | | 256 | 75 | 94 | >38,000 |
| | 15 | Titania (50) | A (5) | a (8/4) | 310 | 88 | 85 | >32,000 |
| | 16 | Alumina (100) | | | 289 | 92 | 91 | >41,000 |
| Comp. Example | 17 | Silica (200) | A (5) | f (10/10) | −230 | 53 | 70 | 22,000 |
| | 18 | | | i (10/10) | 186 | 30 | 21 | 8,000 |
| | 19 | Titania (50) | | | 232 | 36 | 16 | 8,000 |
| | 20 | Alumina (100) | | | 309 | 40 | 19 | 7,000 |

(Note)
[1]; The number in parentheses is the total number of epoxy groups (mmol).
[2]; The number in parentheses is the total N number/primary and secondary N number (mmol).
[3]; The number of copies obtained until fogging occurs in images.

EXAMPLE 3

This example is an example in which a metal oxide powder is simultaneously surface-treated with epoxy-modified silicone oil, an amine compound and straight silicone oil.

A metal oxide powder was surface-treated by the same method as Example 1 except that epoxy-modified silicone oil, an amine compound and straight silicone oil were used for spraying. Table 5 shows together the results of the degree of hydrophobicity and the frictional charge of each of the resultant hydrophobic metal oxide powders relative to iron powder, the fluidity of the toner containing each powder and the life test of an electrophotographic developer. The meanings of the symbols shown in Table 5 are as shown in Tables 1 and 2.

EXAMPLE 4

This example is an example in which a metal oxide powder is surface-treated with epoxy/amino-modified siicone oil obtained by previously reacting epoxy-modified siicone oil and an amine comound, and straight silicone oil.

A metal oxide powder was surface-treated by the same method as Example 2 except that the reaction product obtained by previously mixing epoxy-modified silicone oil and an amine compound at 50° C. for twenty-four hours, and straight silicone oil were used for spraying. Table 6 shows together the results of the degree of hydrophobicity and the frictional charge of each of the resultant hydrophobic metal oxide powders relative to iron powder, the fluidity of the toner containing each powder and the life test of an electrophotographic developer. The meanings of the symbols shown in Table 6 are as shown in Tables 1 and 2.

TABLE 5

| Remarks | Test No. | Metal Oxide Powder (Specific Surface Area: m²/g) | Material Used in Surface Treatment | | | Frictional Charge (μC/g) | Degree of Hydrophobicity (%) | Fluidity (%) | Life Test[3] (Number of Copies) |
|---|---|---|---|---|---|---|---|---|---|
| | | | Epoxy-Modified Silicone Oil (mmol)[1] | Amine (mmol)[2] | Straight Silicone Oil (g) | | | | |
| Example | 1 | Silica (200) | D (5) | a (4/8) | F (2) | 345 | 84 | 88 | >40,000 |
| | 2 | | | | G (2) | 450 | 95 | 85 | >35,000 |
| | 3 | | | | H (2) | 416 | 94 | 84 | >32,000 |
| | 4 | | | | I (2) | 360 | 87 | 92 | >38,000 |
| | 5 | | | a (2.5/5) | F (2) | −120 | 81 | 83 | >41,000 |
| | 6 | | | a (1/2) | | −502 | 90 | 88 | >35,000 |

TABLE 5-continued

| Remarks | Test No. | Metal Oxide Powder (Specific Surface Area: m²/g) | Epoxy-Modified Silicone Oil (mmol)[1] | Amine (mmol)[2] | Straight Silicone Oil (g) | Frictional Charge (μC/g) | Degree of Hydro-phobicity (%) | Fluidity (%) | Life Test[3] (Number of Copies) |
|---|---|---|---|---|---|---|---|---|---|
| | 7 | | | b (4/4) | | 150 | 90 | 86 | >36,000 |
| | 8 | | | c (4/6) | | 130 | 88 | 92 | >36,000 |
| | 9 | | | d (4/6) | | 245 | 82 | 91 | >40,000 |
| | 10 | | | e (4/16) | | 156 | 83 | 87 | >38,000 |
| | 11 | | | f (4/4) | | -400 | 86 | 82 | >32,000 |
| | 12 | | | g (4/4) | | -356 | 90 | 90 | >33,000 |
| | 13 | | | h (4/8) | | 420 | 92 | 80 | >33,000 |
| | 14 | | A (5) | a (4/8) | | 261 | 91 | 83 | >36,000 |
| | 15 | | C (5) | | | 212 | 92 | 84 | >43,000 |
| | 16 | | E (5) | | | 219 | 93 | 86 | >42,000 |
| Example | 17 | Silica (130) | D (5) | a (4/8) | F (2) | 154 | 83 | 80 | >40,000 |
| | 18 | Titania (50) | | | | 248 | 80 | 87 | >35,000 |
| | 19 | Alumina (100) | | | | 265 | 94 | 89 | >37,000 |
| Comp. Example | 20 | Silica (200) | D (5) | a (10/20) | F (2) | 345 | 55 | 66 | 18,000 |
| | 21 | | | | G (2) | 315 | 53 | 67 | 15,000 |
| | 22 | | | | H (2) | 256 | 62 | 58 | 16,000 |
| | 23 | | | | I (2) | 234 | 53 | 69 | 19,000 |
| | 24 | | | f (10/10) | F (2) | 248 | 66 | 70 | 21,000 |
| | 25 | | | i (10/10) | | 101 | 26 | 61 | 18,000 |
| | 26 | Silica (130) | | | | 124 | 30 | 16 | 14,000 |
| | 27 | Titania (50) | | | | 234 | 34 | 11 | 8,000 |
| | 28 | Alumina (100) | | | | 289 | 48 | 7 | 10,000 |

(Note)
[1]; The number in parentheses is the total number of epoxy groups (mmol).
[2]; The number in parentheses is the total N number/primary and secondary N number (mmol).
[3]; The number of copies obtained until fogging occurs in images.

TABLE 6

| Remarks | Test No. | Metal Oxide Powder (Specific Surface Area: m²/g) | Epoxy-Modified Silicone Oil (mmol)[1] | Amine (mmol)[2] | Straight Silicone Oil (g) | Frictional Charge (μC/g) | Degree of Hydro-phobicity (%) | Fluidity (%) | Life Test[3] (Number of Copies) |
|---|---|---|---|---|---|---|---|---|---|
| Example | 1 | Silica (200) | D (5) | a (4/8) | F (2) | 380 | 88 | 88 | >42,000 |
| | 2 | | | | G (2) | 437 | 92 | 85 | >37,000 |
| | 3 | | | | H (2) | 412 | 90 | 94 | >40,000 |
| | 4 | | | | I (2) | 332 | 95 | 89 | >40,000 |
| | 5 | | | a (2.5/5) | F (2) | -80 | 87 | 96 | >41,000 |
| | 6 | | | a (1/2) | | -463 | 89 | 90 | >38,000 |
| | 7 | | | b (4/4) | | 115 | 94 | 93 | >36,000 |
| | 8 | | | c (4/6) | | 130 | 94 | 94 | >40,000 |
| | 9 | | | d (4/6) | | 289 | 90 | 94 | >41,000 |
| | 10 | | | e (4/16) | | 178 | 89 | 92 | >41,000 |
| | 11 | | | f (4/4) | | -354 | 97 | 87 | >37,000 |
| | 12 | | | g (4/4) | | -256 | 96 | 88 | >42,000 |
| | 13 | | | h (4/8) | | 378 | 88 | 91 | >36,000 |
| | 14 | | A (5) | a (4/8) | | 298 | 85 | 90 | >41,000 |
| | 15 | | C (5) | | | 241 | 90 | 86 | >40,000 |
| | 16 | | E (5) | | | 256 | 87 | 85 | >39,000 |
| Example | 17 | Silica (130) | D (5) | a (4/8) | F (2) | 210 | 98 | 88 | >39,000 |
| | 18 | Titania (50) | | | | 325 | 86 | 93 | >35,000 |
| | 19 | Alumina (100) | | | | 241 | 92 | 93 | >43,000 |
| Comp. Example | 20 | Silica (200) | D (5) | a (10/20) | F (2) | 310 | 57 | 70 | 17,000 |
| | 21 | | | | G (2) | 350 | 60 | 71 | 20,000 |
| | 22 | | | | H (2) | 284 | 59 | 65 | 19,000 |

TABLE 6-continued

| Remarks | Test No. | Metal Oxide Powder (Specific Surface Area: m²/g) | Material Used in Surface Treatment | | | Frictional Charge ($\mu$C/g) | Degree of Hydrophobicity (%) | Fluidity (%) | Life Test[3] (Number of Copies) |
|---|---|---|---|---|---|---|---|---|---|
| | | | Epoxy-Modified Silicone Oil (mmol)[1] | Amine (mmol)[2] | Straight Silicone Oil (g) | | | | |
| | 23 | | | | I (2) | 271 | 48 | 66 | 19,000 |
| | 24 | | | f (10/10) | F (2) | 241 | 64 | 61 | 19,000 |
| | 25 | | | i (10/10) | | 112 | 34 | 60 | 22,000 |
| | 26 | Silica (130) | | | | 145 | 44 | 21 | 12,000 |
| | 27 | Titania (50) | | | | 235 | 39 | 9 | 8,000 |
| | 28 | Alumina (100) | | | | 278 | 41 | 33 | 9,000 |

(Note)
[1]; The number in parentheses is the total number of epoxy groups (mmol).
[2]; The number in parentheses is the total N number/primary and secondary N number (mmol).
[3]; The number of copies obtained until fogging occurs in images.

INDUSTRIAL APPLICABILITY

Tables 3 to 6 reveal that the frictional charge of a metal oxide powder can be freely controlled within the range of from negative charge of about −500 $\mu$C/g to positive charge of over 300 $\mu$C/g depending upon the type and amount of the amine compound used for surface treatment, and that, regardless of the charge level required for toner, i.e., a positive or negative level, the charge level can be attained by using the hydrophobic metal oxide powder of the present invention. In addition, the metal oxide powder of the present invention exhibits high precision of charge control.

Further, surface treatment may be carried out at a relatively low heating temperature, and thus a hydrophobic metal oxide powder in which silicone oil coating is strongly joined to the metal oxide powder can be obtained. This metal oxide powder has excellent time stability of hydrophobicity and charge, and exhibits less deterioration in characteristics during use or storage. Therefore, an electrophotographic developer containing the hydrophobic metal oxide powder can sufficiently maintain fluidity even under conditions of high temperature and high humidity, and increases the number copies obtained until good images without fogging cannot be obtained.

Although the present invention has been described with reference to the preferred embodiment, it can be understood by persons skilled in the art that many changes can be made within the scope of the present invention.

What is claimed is:

1. A hydrophobic metal oxide powder having a surface coating formed by simultaneous treatment of a metal oxide powder with materials (A) and (B), where material (A) is a silicone oil having glycidyl epoxy groups, and material (B) is a non-polymeric amine compound having primary and/or secondary amino groups, the amounts of (A) and (B) being such that the total number of primary and/or secondary amino groups in molar units in the amount of material (B) is lower than the total number of the epoxy groups in molar units in the amount of material (A), the amine compound of material (B) being an amine selected from the group consisting of an aliphatic primary amine of the formula $R^1NH_2$, where $R^1$ is an alkyl group having 4 to 20 carbon atoms and an alkyl group $R^1$ may have an ether bond, an aromatic amine having at least one primary or secondary amino group, a heterocyclic amine having at least one primary or secondary amino group, an aliphatic secondary amine of the formula $R^1R^2NH$, where $R^1$ and $R^2$ are the same or different alkyl groups each having 1 to 10 carbon atoms, and an alky $R^1$ and/or $R^2$ group may have an ether bond, a diamine of the formula $R^1R^2NXNHR^3$, where $R^1$, $R^2$ and $R^3$ are each a hydrogen atom or an alkyl group having 1 to 10 carbon atoms, and may be the same or different, an alkyl group $R^1$, $R^2$ and/or $R^3$ may have an ether bond, and X is an alkylene group having 1 to 10 carbon atoms, a triamine of the formula $R^1R^2NXNR^3YNHR^4$, $R^1$, $R^2$, $R^3$ and $R^4$ are each a hydrogen atom or an alkyl group having 1 to 10 carbon atoms, but, all the $R^1$, $R^2$, $R^3$, and $R^4$ groups are not hydrogen atoms, and may be the same or different, an alkyl group $R^1$, $R^2$, $R^3$, and/or $R^4$ may have an ether bond, and X and Y are each an alkylene group having 1 to 10 carbon atoms, an alicyclic amine having at least one primary or secondary amino group, and a heterocyclic amine having primary or secondary aminoalkyl group.

2. A hydrophobic metal oxide powder according to claim 1, wherein the silicone oil having glycidyl epoxy groups has an epoxy equivalent of 200 to 3000 g/mol, and the amine compound is a compound represented by the formula $R^1R^2NXNHR^3$, wherein $R^1$, $R^2$ and $R^3$ are the same or different, and are each hydrogen or an alkyl group having 1 to 10 carbon atoms in which the alkyl group may contain an ether bond, and X is an alkylene group having 1 to 10 carbon atoms, and wherein the hydrophobic metal oxide power has a frictional charge within the range of +10 to +250 $\mu$C/g.

3. A hydrophobic metal oxide powder according to claim 2, wherein in the formula of the amine compound, $R^1$ and $R^2$ are each an alkyl group having 1 to 6 carbon atoms, $R^3$ is hydrogen or alkyl group having 1 to 6 carbon atoms, X is $-(CH_2)_n-$ (n is an integer of 2 to 4).

4. A hydrophobic metal oxide powder according to claim 1, wherein the silicone oil having glycidyl epoxy groups is a silicone oil having glycidyl groups at both terminals of its molecules, an epoxy equivalent of 300 to 1000 g/mol, and a viscosity of 10 to 50 cSt at 25° C.

5. A hydrophobic metal oxide powder according to claim 1 wherein an amount of the amine compound is used so that the molar ratio of the total of primary groups and secondary groups in the amount of amine compound to the total number of the epoxy groups in the amount of the silicone oil (A) is within the range of 0.1 to 0.9.

6. A hydrophobic metal oxide powder according to claim 1, wherein the silicone oil (A) is used for surface treatment in an amount of 5 to 40 parts by weight relative to 100 parts by weight of the metal oxide powder.

7. A hydrophobic metal oxide powder according to claim 1, wherein the metal oxide is silica, alumina or titania.

8. A hydrophobic metal oxide powder according to claim 1, wherein the degree of hydrophobicity of the hydrophobic metal oxide powder measured by a transmittance method is 60% or more.

9. An electrophotographic developer comprising a toner and the hydrophobic metal oxide powder of claim 1.

10. An electrophotographic developer according to claim 9 wherein the metal oxide is a charge controller for the toner.

11. A hydrophobic metal oxide powder having a surface coating formed by surface treatment of a metal oxide powder with silicone oil having glycidyl epoxy groups and amino groups, wherein the silicone oil having glycidyl epoxy groups and amino groups is obtained by reacting materials (A) and (B), where material (A) is a silicone oil having glycidyl epoxy groups, and material (B) is a non-polymeric amine compound having primary and/or secondary amino groups, the amounts of (A) and (B) being such that the total number of primary and/or secondary amino groups in the amount of material (B) in molar units is lower than the number necessary for reaction with all epoxy groups measured in molar units in the amount of material (A), the amine compound being an amine selected from the group consisting of an aliphatic primary amine of the formula $R^1NH_2$, where $R^1$ is an alkyl group having 4 to 20 carbon atoms and an alkyl group $R^1$ may have an ether bond, an aromatic amine having at least one primary or secondary amino group, a heterocyclic amine having at least one primary or secondary amino group, an aliphatic secondary amine of the formula $R^1R^2NH$, where $R^1$ and $R^2$ are the same or different alkyl groups each having 1 to 10 carbon atoms, and an alky $R^1$ and/or $R^2$ group may have an ether bond, a diamine of the formula $R^1R^2NXNHR^3$, where $R^1$, $R^2$ and $R^3$ are each a hydrogen atom or an alkyl group having 1 to 10 carbon atoms, and may be the same or different, an alkyl group $R^1$, $R^2$ and/or $R^3$ may have an ether bond, and X is an alkylene group having 1 to 10 carbon atoms, a triamine of the formula $R^1R^2NXNR^3YNHR^4$, $R^1$, $R^2$, $R^3$ and $R^4$ are each a hydrogen atom or an alkyl group having 1 to 10 carbon atoms, but, all the $R^1$, $R^2$, $R^3$, and $R^4$ groups are not hydrogen atoms, and may be the same or different, an alkyl group $R^1$, $R^2$, $R^3$, and/or $R^4$ may have an ether bond, and X and Y are each an alkylene group having 1 to 10 carbon atoms, an alicyclic amine having at least one primary or secondary amino group, and a heterocyclic amine having primary or secondary aminoalkyl group.

12. A hydrophobic metal oxide powder according to claim 11, wherein the silicone oil having epoxy groups has an epoxy equivalent of 200 to 3000 g/mol, and the amine compound is a compound represented by the formula $R^1R^2NXNHR^3$, wherein $R^1$, $R^2$, and $R^3$, are the same or different, and are each hydrogen or an alkyl group having 1 to 10 carbon atoms in which the alkyl group may contain an ether bond, and X is an alkylene group having 1 to 10 carbon atoms, and wherein the hydrophobic metal oxide powder has a frictional charge within the range of +10 to +250 $\mu C/g$.

13. A hydrophobic metal oxide powder according to claim 12, wherein, in the formula of the amine compound, $R^1$ and $R^2$ are each an alkyl group having 1 to 6 carbon atoms, $R^3$ is hydrogen or an alkyl group having 1 to 6 carbon atoms, X is —$(CH)_n$— where n is an integer of 2 to 4.

14. A hydrophobic metal oxide powder according to claim 11 wherein the silicone oil having epoxy groups is a silicone oil having glycidyl groups at both terminals of its molecules, an epoxy equivalent of 300 to 1000 g/mol, and a viscosity of 10 to 50 cSt at 25° C.

15. A hydrophobic metal oxide powder according to claim 11, wherein the amine compound is used so that the molar ratio of the total of primary groups and secondary groups in the amount of the amine compound to the total number of the epoxy groups in the amount of the silicone oil X is within the range of 0.1 to 0.9.

16. A hydrophobic metal oxide powder according to claim 11 wherein the silicone oil is used for surface treatment in an amount of 5 to 40 parts by weight relative to 100 parts by weight of metal oxide powder.

17. A hydrophobic metal oxide powder according to claim 11, wherein the metal oxide is silica, alumina or titania.

18. A hydrophobic metal oxide powder according to claim 11, wherein the degree of hydrophobicity of the hydrophobic metal oxide powder measured by a transmittance method is 60% or more.

19. An electrophotographic developer comprising a toner and the hydrophobic metal oxide powder of claim 11.

20. An electrophotographic developer according to claim 19 wherein the metal oxide is a charge controller for the toner.

21. A hydrophobic metal oxide powder having a surface coating formed by surface treatment of a metal oxide powder with materials (A),(B) and (C), where material (A) is a silicone oil having epoxy groups, and material (B) is a non-polymeric amine compound having primary and/or secondary amino groups, the amounts of (A) and (B) being such that the total number of primary and/or secondary amino groups in molar units in the amount of material (B) is lower than the number of the epoxy groups in molar units in the amount of material (A), and where material (C) is straight silicone oil, the amine compound of material (B) being an amine selected from the group consisting of an aliphatic primary amine of the formula $R^1NH_2$, where $R^1$ is an alkyl group having 4 to 20 carbon atoms and an alkyl group $R^1$ may have an ether bond, an aromatic amine having at least one primary or secondary amino group, a heterocyclic amine having at least one primary or secondary amino group, an aliphatic secondary amine of the formula $R^1R^2NH$, where $R^1$ and $R^2$ are the same or different alkyl groups each having 1 to 10 carbon atoms, and an alky $R^1$ and/or $R^2$ group may have an ether bond, a diamine of the formula $R^1R^2NXNHR^3$, where $R^1$, $R^2$ and $R^3$ are each a hydrogen atom or an alkyl group having 1 to 10 carbon atoms, and may be the same or different, an alkyl group $R^1$, $R^2$ and/or $R^3$ may have an ether bond, and X is an alkylene group having 1 to 10 carbon atoms, a triamine of the formula $R^1R^2NXNR^3YNHR^4$, $R^1$, $R^2$, $R^3$ and $R^4$ are each a hydrogen atom or an alkyl group having 1 to 10 carbon atoms, but, all the $R^1$, $R^2$, $R^3$, and $R^4$ groups are not hydrogen atoms, and may be the same or different, an alkyl group $R^1$, $R^2$, $R^3$, and/or $R^4$ may have an ether bond, and X and Y are each an alkylene group having 1 to 10 carbon atoms, an alicyclic amine having at least one primary or secondary amino group, and a heterocyclic amine having primary or secondary aminoalkyl group.

22. A hydrophobic metal oxide powder having a surface coating formed by surface treatment of a metal oxide powder with silicone oil having glycidyl epoxy groups and amino groups and straight silicone oil, wherein the silicone oil having glycidyl epoxy groups and amino groups is obtained by reacting materials (A) and (B) where material (A) is a silicone oil having epoxy groups, and material (B) is a non-polymeric amine compound having primary and/or secondary amino groups the amounts of (A) and (B) being such that the total number of primary and/or secondary amino groups in molar units in the amount of material (B) is lower than the number necessary for reaction with all epoxy groups measured in molar units in the amount of material (A), the amine compound of material (B) being an amine selected from the group consisting of an aliphatic primary amine of the formula $R^1NH_2$, where $R^1$ is an alkyl group having 4 to 20 carbon atoms and an alkyl group $R^1$ may have an ether bond, an aromatic amine having at least one primary or secondary amino group, a heterocyclic amine having at least one primary or secondary amino group, an aliphatic secondary amine of the formula $R^1R^2NH$, where $R^1$ and $R^2$ are the same or different alkyl groups each having 1 to 10 carbon atoms, and an alky $R^1$ and/or $R^2$ group may have an ether bond, a diamine of the formula $R^1R^2NXNHR^3$, where $R^1$, $R^2$ and $R^3$ are each a hydrogen atom or an alkyl group having 1 to 10 carbon atoms, and may be the same or different, an alkyl group $R^1$, $R^2$ and/or $R^3$ may have an ether bond, and X is an alkylene group having 1 to 10 carbon atoms, a triamine of the formula $R^1R^2NXNR^3YNHR^4$, $R^1$, $R^2$, $R^3$ and $R^4$ are each a hydrogen atom or an alkyl group having 1 to 10 carbon atoms, but, all the $R^1$, $R^2$, $R^3$, and $R^4$ groups are not hydrogen atoms, and may be the same or different, an alkyl group $R^1$, $R^2$, $R^3$, and/or $R^4$ may have an ether bond, and X and Y are each an alkylene group having 1 to 10 carbon atoms, an alicyclic amine having at least one primary or secondary amino group, and a heterocyclic amine having primary or secondary aminoalkyl group.

* * * * *